(12) United States Patent
Konvicka et al.

(10) Patent No.: US 7,226,403 B2
(45) Date of Patent: Jun. 5, 2007

(54) MACHINE TOOL, IN PARTICULAR A DRILLING AND MILLING MACHINE

(75) Inventors: Jan Konvicka, Biel (CH); Markus Reimann, Lyss (CH)

(73) Assignee: Mikron Agie Charmilles Ali, Nidau (CH)

( * ) Notice: Subject to any disclaimer, the term of this patent is extended or adjusted under 35 U.S.C. 154(b) by 0 days.

(21) Appl. No.: 11/502,292

(22) Filed: Aug. 10, 2006

(65) Prior Publication Data

US 2007/0042882 A1 Feb. 22, 2007

(30) Foreign Application Priority Data

Aug. 19, 2005 (EP) .................................. 05018056

(51) Int. Cl.
*B23P 3/157* (2006.01)
*B23Q 11/08* (2006.01)
*B23Q 7/00* (2006.01)

(52) U.S. Cl. .............................. 483/14; 483/3; 409/134; 409/202; 409/165; 29/33 P; 198/346.1

(58) Field of Classification Search ............ 483/14–15, 483/3; 29/33 P, 563; 409/134, 159, 202, 409/212, 165, 241 G, 70–71; 198/346.1
See application file for complete search history.

(56) References Cited

U.S. PATENT DOCUMENTS 4,712,282 A * 12/1987 Romeu ....................... 29/27 C
5,172,464 A * 12/1992 Kitamura et al. ............ 29/33 P
5,897,430 A * 4/1999 Haller ........................ 451/451
6,749,495 B2 * 6/2004 Grund et al. ................ 409/134
6,761,515 B2 * 7/2004 Laur et al. .................... 483/14
2003/0183635 A1 * 10/2003 Fujii et al. ................ 220/345.6
2006/0269375 A1 * 11/2006 Takayama et al. .......... 409/134
2006/0270540 A1 * 11/2006 Takayama et al. ............. 483/3

FOREIGN PATENT DOCUMENTS

| DE | 4203994 A1 | * | 8/1993 |
| EP | 0 712 682 | | 5/1996 |
| JP | 7-148640 A | * | 6/1995 |
| JP | 2000-24866 A | * | 1/2000 |
| JP | 2002-137143 A | * | 5/2002 |
| JP | 2006-95666 A | * | 4/2006 |

* cited by examiner

*Primary Examiner*—Erica Cadugan
(74) *Attorney, Agent, or Firm*—Bachman & LaPointe, P.C.

(57) ABSTRACT

A machine tool (1, 1'), in particular a drilling and milling machine, comprising a housing (20) having a machine bed (2), together with side walls (3, 4) and doors (5, 6, 7), comprising a fixed, pivotable or rotatable work table (8, 9), and comprising a slide (10), transportable in the y direction, for the reception of a spindle head (11), transportable in the x-z direction, for the reception of tools (12), wherein the front door (5), for the enlargement of the working and loading area (21) in the upward direction, is of transomless configuration, the roof region (13) of the machine (1, 1') has an automatically operable cover (16), the rear region (22) of the machine (1, 1') has an integrable automatic pallet changer (14), and the machine (1, 1') is assigned an automatic tool changer (15).

8 Claims, 8 Drawing Sheets

MACHINE TOOL, IN PARTICULAR A DRILLING AND MILLING MACHINE

BACKGROUND OF THE INVENTION

The invention relates to a machine tool, in particular a drilling and milling machine, comprising a housing having a machine bed, together with side walls and doors, comprising a fixed, pivotable or rotatable work table, and comprising a slide, transportable in the y direction, for the reception of a spindle head, transportable in the x-z direction, for the reception of tools.

In EP 0 712 682, a machine tool, in particular a drilling and milling machine, is proposed, which is provided with a machine stand on which a motor-driven longitudinal slide, guided on guide rails, is horizontally movable. A machining head, which has a rotary drive apparatus for at least one tool, is movable on the longitudinal slide in at least one further motional direction by motor power. The machine stand has two spaced-apart side walls, on which the longitudinal slide is at least partially guided and the space between which is configured as a machining area. On each of the two side walls, there is provided an attachment point for at least one pivotable workpiece holder, the two attachment points being mutually aligned, in a horizontal line forming a pivot axis, transversely to the longitudinal direction of the guide rails. In such an arrangement, the workpiece holder is easily accessible and maintenance-friendly and is easily exchangeable. Machining residues, such as chips, lubricant and coolant, are unable to get to the bearings and drive means, or can do so only with difficulty.

A machine tool of this generic type, configured as a milling machine, is known from DE 4203 994. In this widely used type of milling machine, the slide moves in the longitudinal direction and the machining head is disposed on the slide such that it is vertically movable. A movement in the transverse direction is realized by the correspondingly driven workpiece table. Its drive mechanism in the lower region of the machine has to be protected, in a complex manner, from machining residues, such as chips and lubricant. In the case of a greater lateral deflection of the workpiece table, the danger exists of an albeit very minor deformation as a result of its own mass and the workpiece mass, as well as the forces applied by the tool, so that, in practice, the workpiece table has instead of a linear motional path, in order to compensate for the deformation, an orbit-like path with a radius of a few kilometres, to enable high-precision milling works to be carried out. The movement apparatus, in particular for the workpiece table in high-precision milling machines, thereby becomes very complex and expensive. For a 5-axis machining, the workpiece table or the machining head must additionally be pivotably configured, which further increases the design complexity.

There are also so-called gantry versions of milling machines, in which the longitudinal slide bearing the machining head is guided on two parallel rails disposed on the top side of two side walls of the machine stand. The longitudinal slide is in this case guided on the two guide rails by means of four guide elements. Also, for a 5-axis machining, either the machining head is pivotably configured in a constructionally complex manner, or the workpiece table mounted on a base wall of the machine stand must be pivotably configured, whereby, in the absence of complex and expensive sealing measures, there is the danger of machining residues, lubricant and coolant getting into the drive apparatus of the workpiece table.

The object of the invention is to provide a machine tool of the aforesaid generic type, in which the possibility of an integration of a pallet changer and/or tool changer is given. The housing should be quick and easy to assemble in order to ensure a rapid exchange of fitted elements. In addition, the machine should be capable of producing bulky and heavy components simultaneously.

SUMMARY OF THE INVENTION

According to the invention, the object is achieved by virtue of the fact that the front door, for the enlargement of the working and loading area in the upward direction, is of transomless configuration, the roof region of the machine has an automatically operable cover, the rear region of the machine has an integrable automatic pallet changer, and the machine is assigned an automatic tool changer.

The machine can be configured as a 3-axis or 5-axis arrangement. In the machine according to the invention there is integrated a multiple pallet changer, a tool magazine with tool changer. The machine is generally equipped with high-power motor spindles.

According to a particularly preferred embodiment, the machine tool has an automatic cover, which is configured as a concertina.

Through the use of a concertina in the roof region of the machine, a large space for the loading of bulky parts can be created in connection with the transomless door. According to the invention, the cover can be connected on the slide and/or on the upper edge of the front door side. The concertina can unfolded or folded with the aid of the slide and can be moved away from the door side in order that a free, upwardly open door is formed.

Preferably, an automatic pallet changer, which is displaceable parallel to the side walls on rails disposed within the machine, can be integrated in the machine tool.

The presence of an automatic pallet changer allows the machining process to be significantly improved. The automatic pallet change can be used in serial machining for time-saving purposes.

According to a particularly preferred embodiment, the pallet changer has at least two mechanically, electromechanically or hydraulically actuable supports for the reception of the pallets, the supports being disposed on a displaceable and rotatable trolley.

The pallet changer preferably possesses two opposite situated receiving fixtures for pallets, on which lie the workpieces to be machined. In a first step, the pallet changer travels with the work-surface-facing receiving fixture to the work table and unloads the pallet containing the workpiece onto the work table. Following the machining of the workpiece, the trolley collects the pallet containing the workpiece, travels back, collects with the empty receiving fixture facing away from the machine a further pallet containing a workpiece which is yet to be machined, the receiving fixtures are rotated by 180° in order, on the one hand, to unload the pallet containing the machined workpiece and, on the other hand, to take the pallet containing the workpiece yet to be machined to the machine work table. In addition, an automatically operable pallet magazine can be connected to the pallet changer.

Advantageously, the machine tool is assigned an automatic tool changer, which, through a side door in the housing of the machine, serves for the changing of the tools, the tools being deposited in and collected from a tool magazine disposed directly alongside the machine.

According to the invention, the machine tool is configured such that the sight of and accessibility to the workpiece and work chamber during the machining, pallet changing or tool changing is unrestricted.

BRIEF DESCRIPTION OF THE DRAWINGS

Illustrative embodiments of the invention are represented in the drawing and described in greater detail below, wherein.

DETAILED DESCRIPTION

Figure 1:
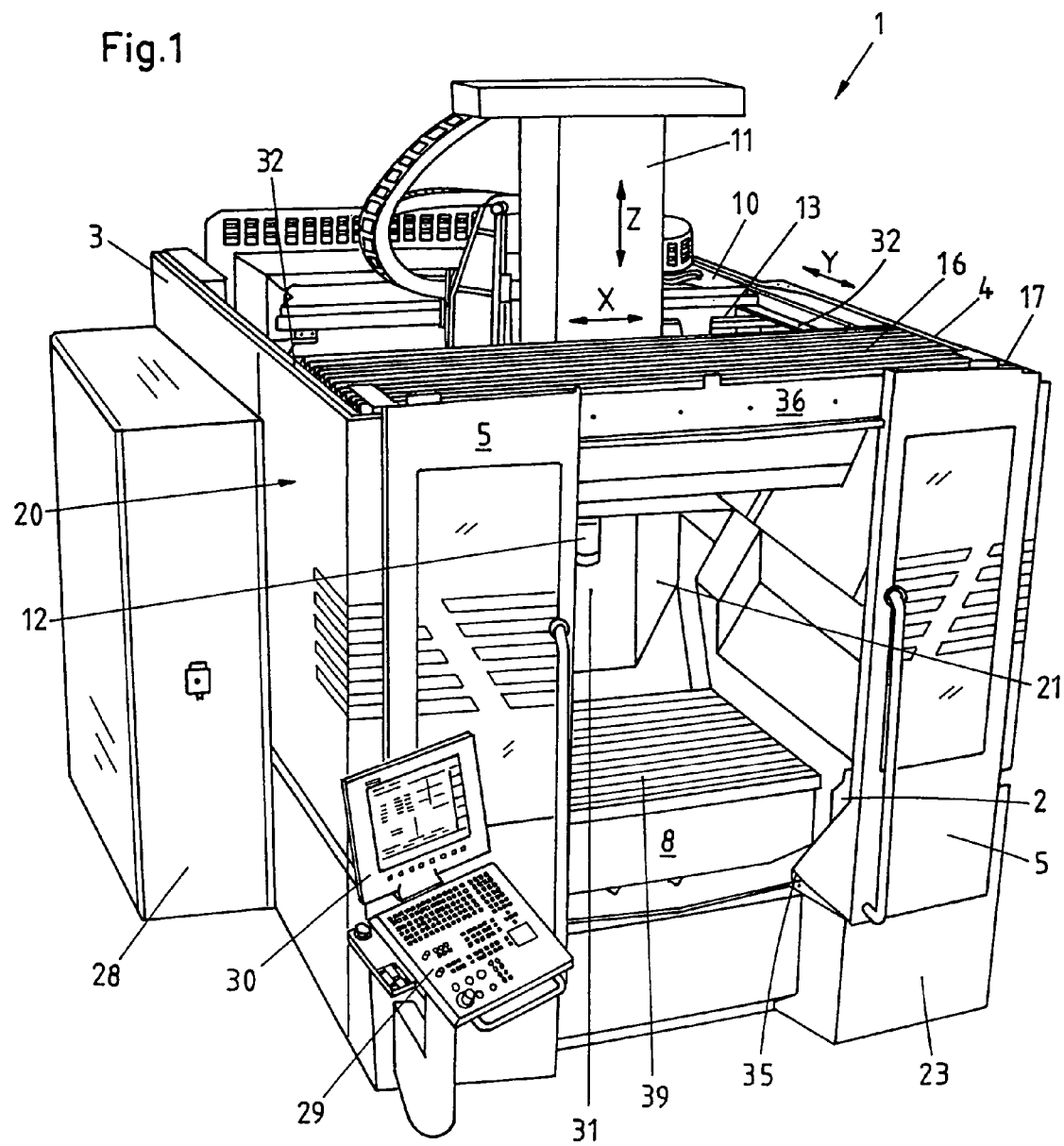
FIG. 1 shows a machine tool in 3-axis construction.
Figure 2:
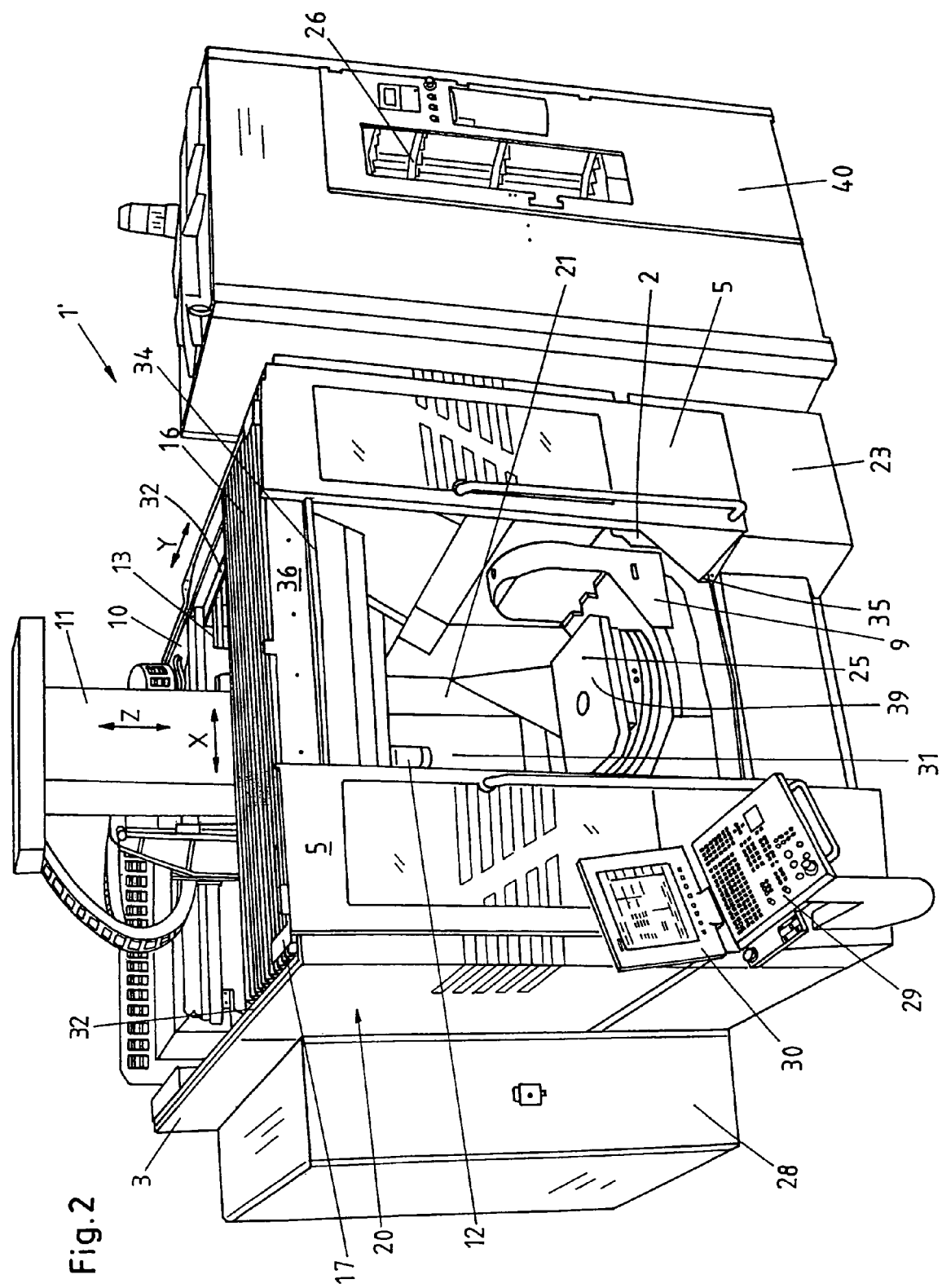
FIG. 2 shows a machine tool in 5-axis construction.

FIG. 1 shows a machine tool 1 in 3-axis construction. FIG. 2 shows a machine tool 1' in 5-axis construction. The reference symbols of the two machines 1 and 1' have the same meaning. The housing 20 comprises the side walls 3 and 4 and the front and rear door walls 23 and 31 containing the doors 5 and 6. The front door 5 is configured as a two-part sliding door, the door guides 35 lying in the lower region 39 of the front door wall 23 and the upper region 34 of the door wall 23 being free. A free loading area 21 for large-sized parts is thereby enabled. In the upper roof region 13, there is provided as a partial roof cover a concertina 16 together with the cross bar 36, which latter is detachably connected on the upper edge 17 of the front door side 23. The concertina 16 is folded or unfolded by means of the slide 10. The rear door 6 is configured as a tilt-up door and serves for the supply of pallets delivered by the automatic pallet changer 14 (not visible in FIGS. 1 and 2) disposed in the rear machine region 22. The slide 10 is transportable along the rails 32 of the side walls 3 and 4 in the y direction. On the slide 10, the spindle head 11 with the tool 12 is disposed displaceably in the x and z-direction. The housing 20 encloses the machine bed 2 containing the fixed work table 8 in FIG. 1 and the rotatable and pivotable table 9 in FIG. 2. In FIG. 1, a cabinet 28 for the electrics of the machine is disposed to the side of the machine. The machine is operable via the console 29, which is provided with a monitor 30. In the right side wall 4 of the housing 20, a door 7 is provided as entrance for the tool change. The machine 1' represented in FIG. 2 shows a cabinet 40 serving as a tool magazine 26. The tools are delivered to the spindle head 11 by means of a tool changer (not shown in FIGS. 1 and 1').

Figure 3:
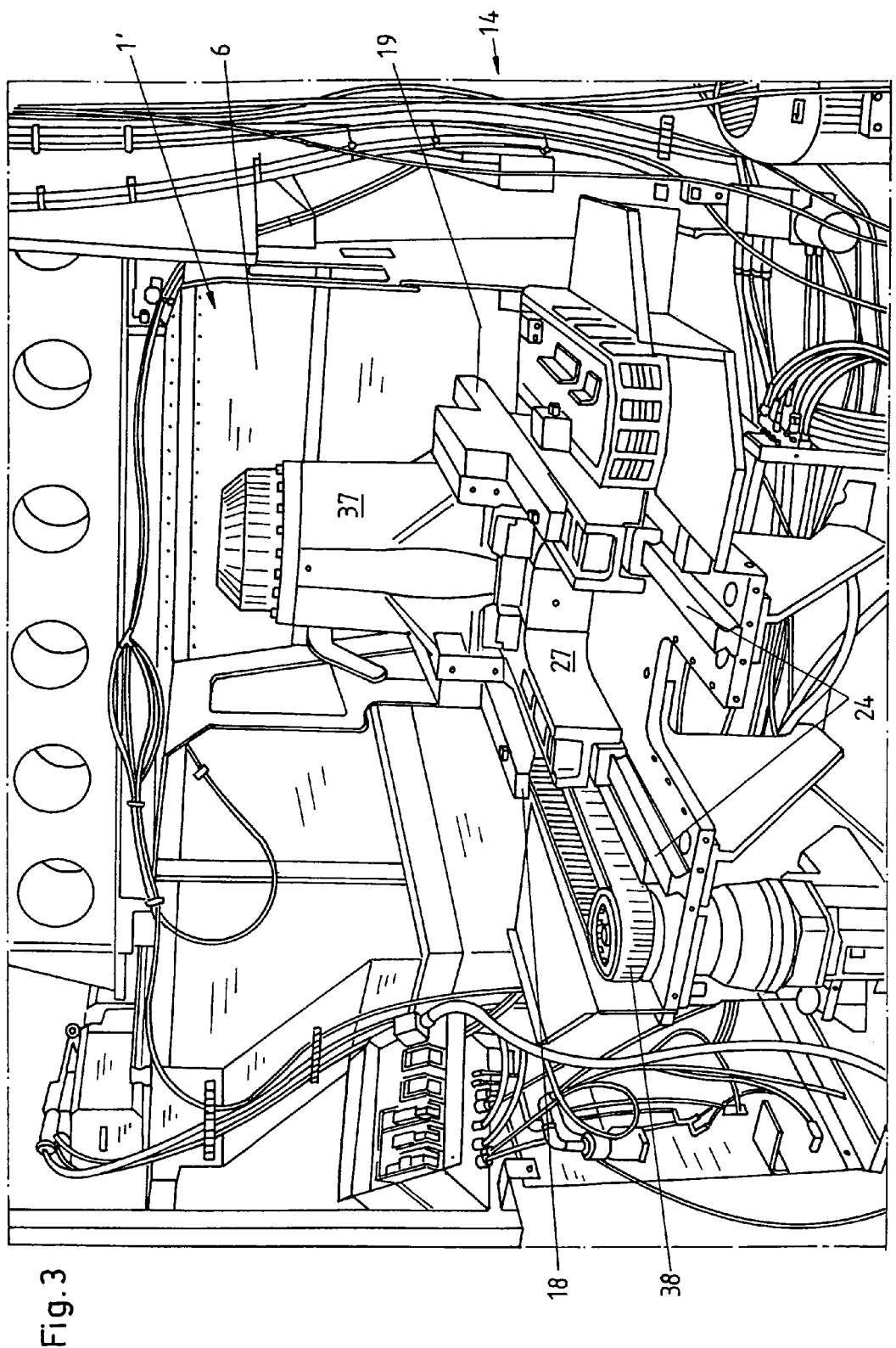
FIG. 3 to 6 show a pallet changer integrated in the machine, in various positions.
Figure 4:
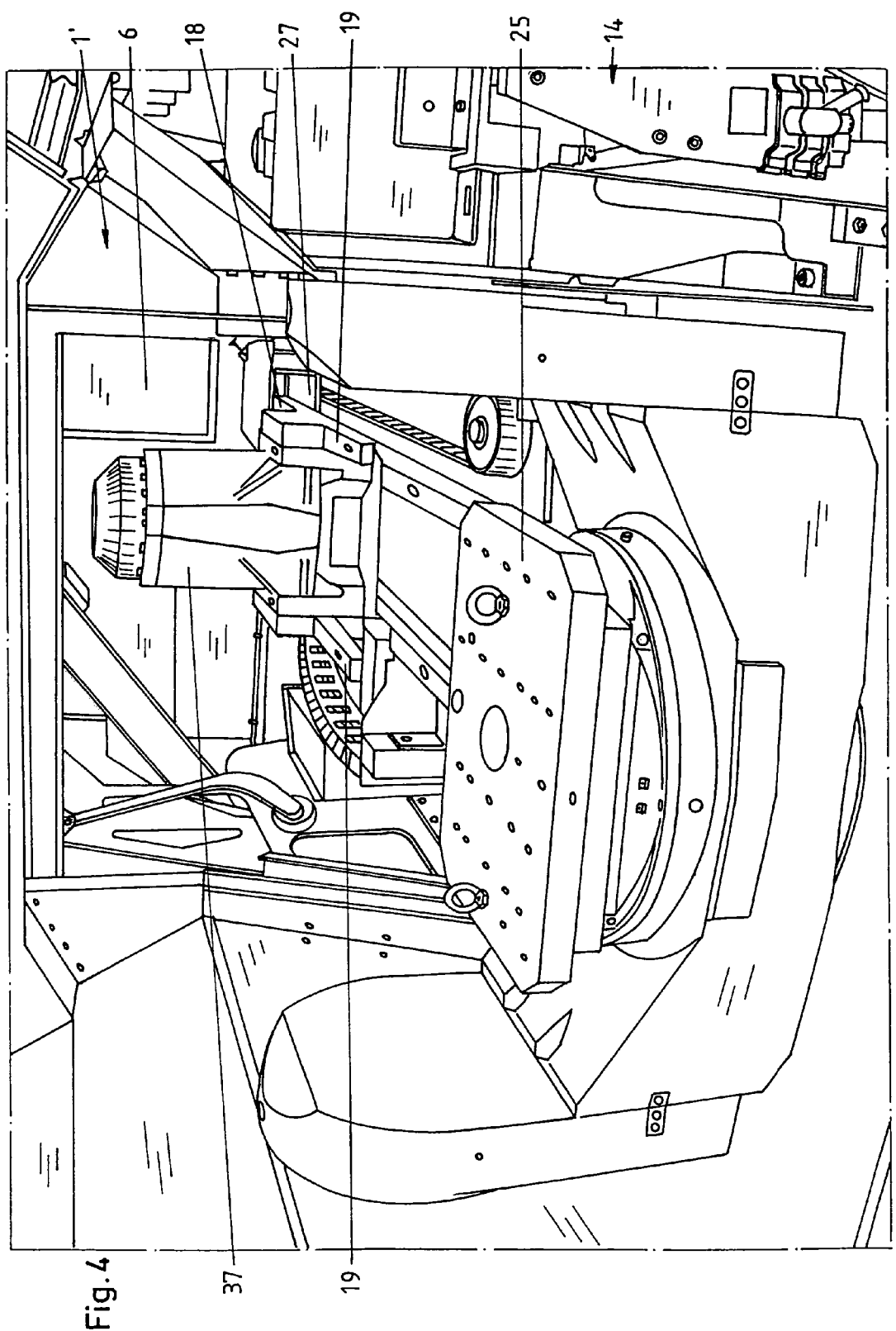
Figure 5:
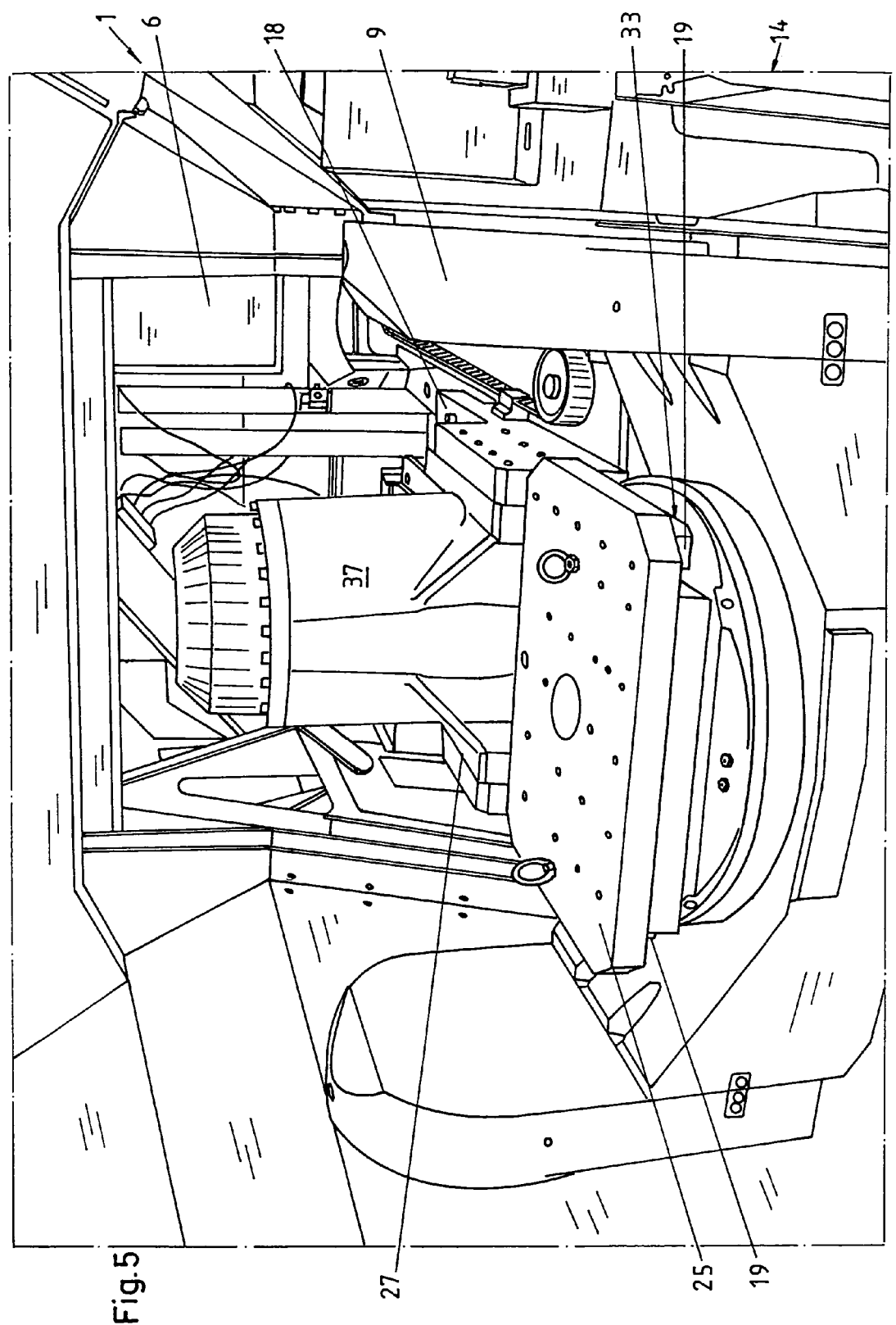
Figure 6:
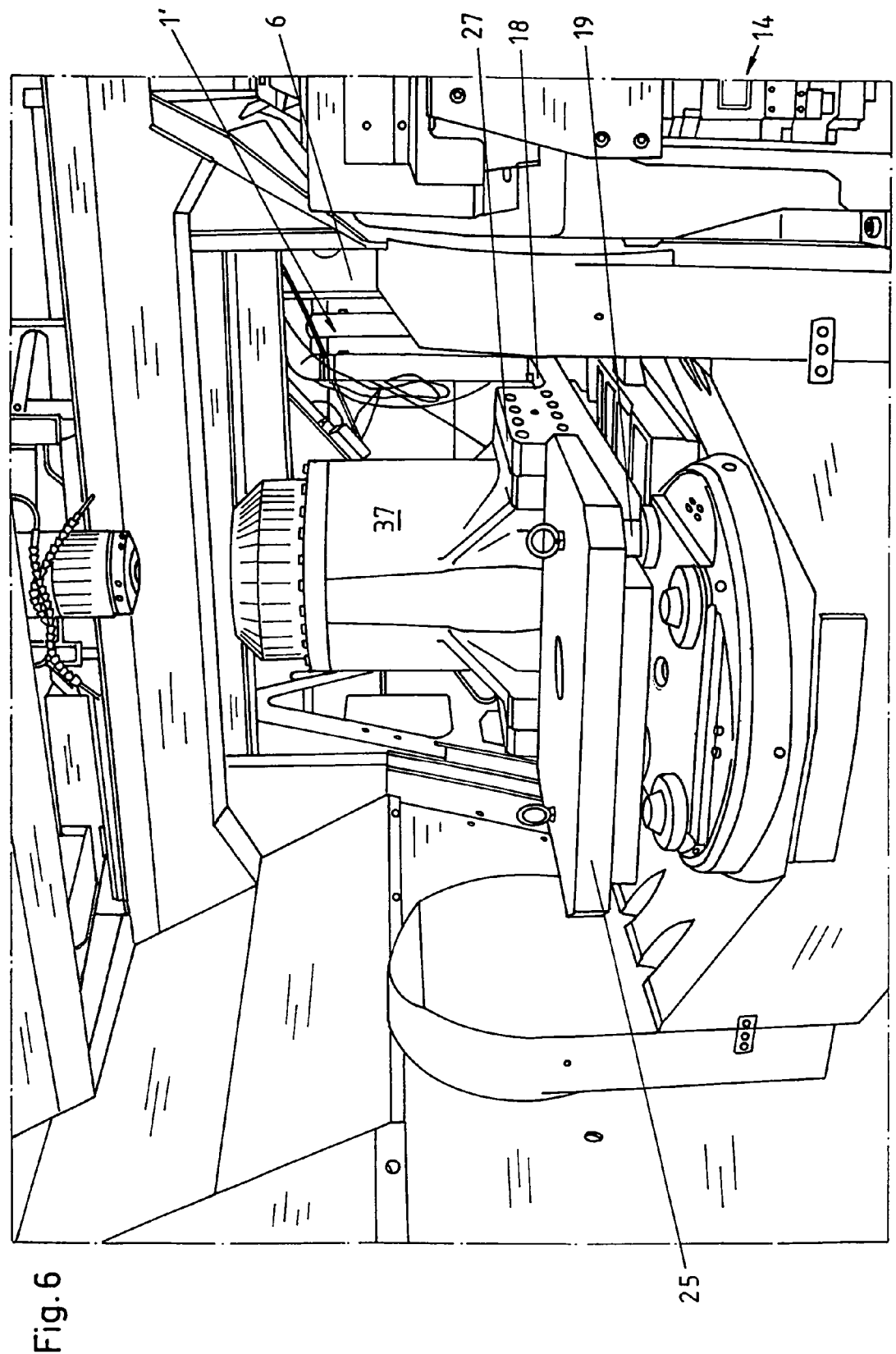

In FIGS. 3 to 6, the pallet changer 14 integrated in the machine tool is shown. A trolley 27 is transportable on rails 24 parallel to the side walls 3 and 4 of the machine 1, the rails 24 being guided by the rear door 6 configured as a tilt-up door. In the middle of the trolley 27 there is disposed a hydraulic apparatus 37, which respectively operates two forwardly and rearwardly directed supports 18 and 19 in such a way that the pallets 25 to be transported and changed are raised and lowered or rotated. The trolley is driven by means of a gear belt 38. FIG. 3 shows the trolley 27 with an empty support 18 and 19 in front of the closed door 6 of the machine 1. In FIG. 4 the door 6 is open, the trolley 27 moves with the empty support 19 in the direction of the work table 9 to collect the pallet 25. In FIG. 5, the arms 33 of the support 19 reach beneath the pallet 25. In FIG. 6, the pallet 25 is shown ready to be transported away by the hydraulically raised support 19. Outside, the trolley 27, together with the supports 18 and 19, can be rotated by 180°, and a new pallet, for example, can be fed to the work table 9 by the reverse procedure.

Figure 7:
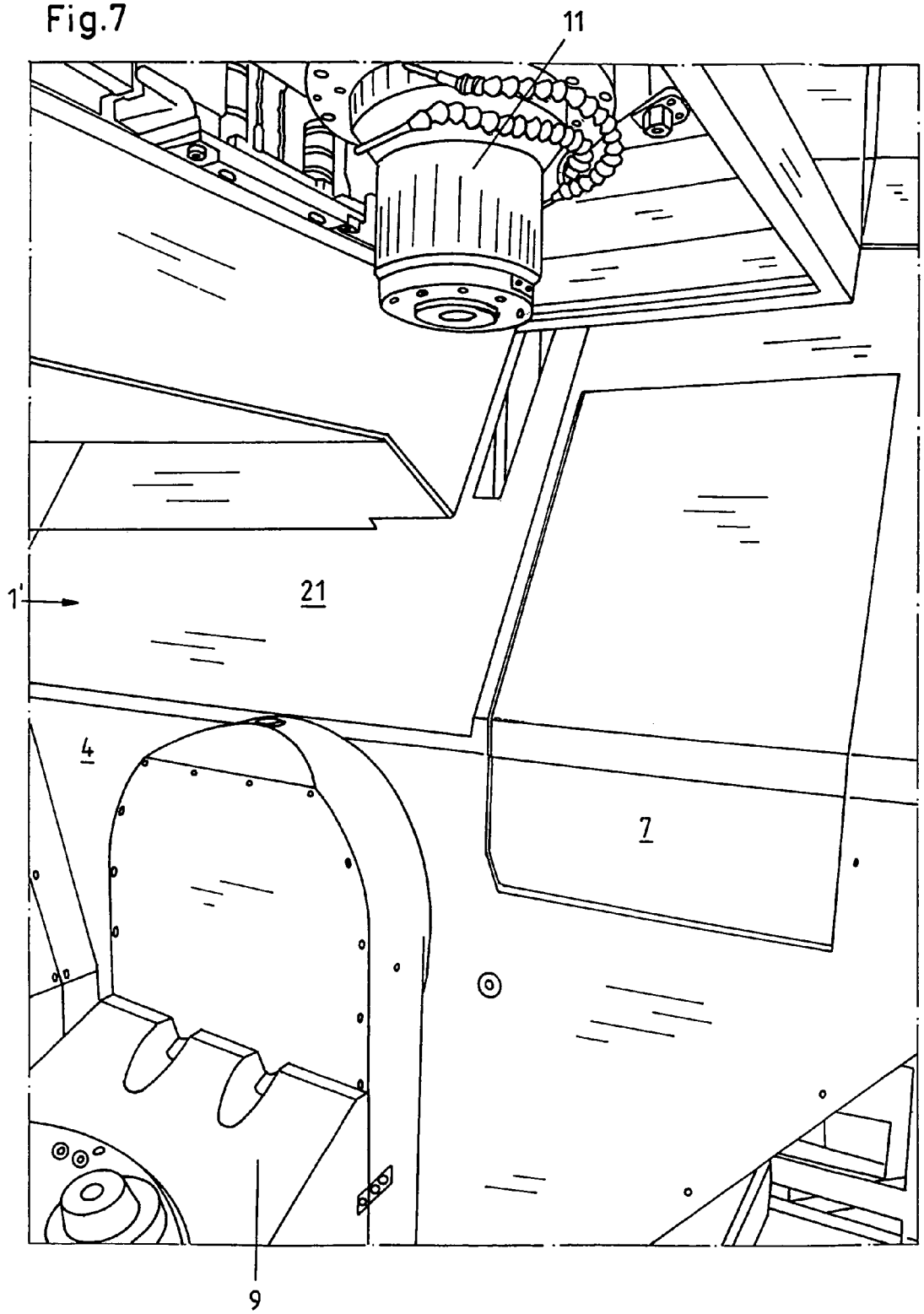
FIG. 7 shows the interior of a machine with closed door for the tool changer.
Figure 8:
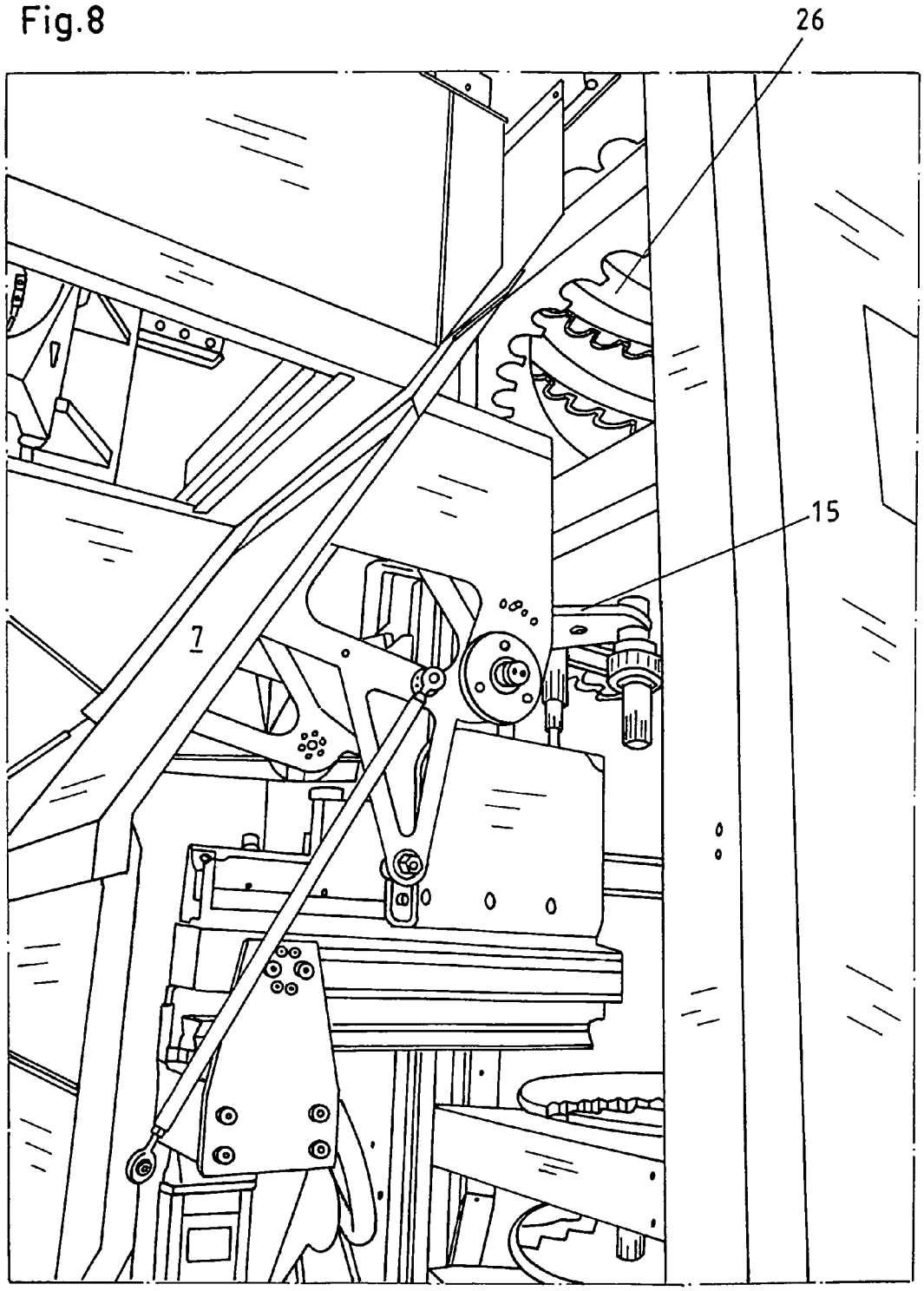
FIG. 8 shows an interior of a machine with open door for the tool changer.

FIGS. 7 and 8 show the door 7 in the side wall 4 of the machine 1'. This door 7 serves for the feeding of a tool changer 15. The upward-tilting door is closed in FIG. 7. In FIG. 8, a tool changer 15 juts into the machine room 21 in order to collect tools from the tool magazine 26 and deliver them to the spindle head 11.

The advantages associated with the machine tool according to the invention lie, in particular, in providing a compact machine which, through the integration of a pallet changer and a tool changer, is suitable for rapidly changing pallets and tools, whilst maintaining an unrestricted sight of the workpiece. The operator accessibility to the work chamber is restricted neither by the pallet changer nor by the tool changer. Furthermore, the pallet changer can be readily connected to a pallet magazine. Due to the special roof construction, moreover, it is possible to convey large parts into the work chamber and to machine them with extreme precision.

The invention claimed is:

1. Machine tool (1, 1'), in the form of a drilling and milling machine, comprising a housing (20) having a machine bed (2), together with side walls (3, 4) and doors (5, 6, 7), comprising a fixed, pivotable or rotatable work table (8, 9), and comprising a slide (10), transportable in a first direction, for the reception of a spindle head (11), said spindle head transportable in directions substantially perpendicular to the first direction, for the reception of tools, wherein the doors include a front door (5), which, for the enlargement of a working and loading area (21) of the machine in the upward direction, is of transomless configuration, a roof region (13) of the machine (1, 1') has an automatically operable cover (16), a rear region (22) of the machine (1, 1') has an integrable pallet changer (14), and the machine (1, 1') is assigned an automatic tool changer (15).

2. Machine tool according to claim 1, wherein the automatic cover (16) is configured as a concertina.

3. Machine tool according to claim 2, wherein the cover (16) can be detachably connected on the slide (10) and/or on the upper edge (17) of a front door side wall (23).

4. Machine tool according to claim 1, wherein the automatic pallet changer (14) has a trolley (27), which is displaceable parallel to the side walls (3, 4) on rails (24) disposed within the machine (1, 1').

5. Machine tool according to claim 4, wherein the pallet changer (14) has at least two mechanically, electromechanically or hydraulically actuable supports (18, 19) for the reception of the pallets (25), the supports being disposed on the displaceably mounted trolley (27) such that they can be raised, lowered and rotated.

6. Machine tool according to claim 5, wherein the pallet changer (14) is connectable to an automatic pallet magazine.

7. Machine tool according to claim 1, wherein the sight of and accessibility to the workpiece and a work chamber of the machine during machining, pallet changing or tool changing is unrestricted.

8. Machine tool according to claim 1, wherein the automatic tool changer (15), for the operation of the machine (1, 1'), can be introduced through a side door (7) in the housing (20) of the machine (1, 1') in order to change the tools (12), the tools (12) being removable from a tool magazine (26) disposed directly alongside the machine (1, 1').

* * * * *

UNITED STATES PATENT AND TRADEMARK OFFICE
CERTIFICATE OF CORRECTION

| | |
|---|---|
| PATENT NO. | : 7,226,403 B2 |
| APPLICATION NO. | : 11/502292 |
| DATED | : June 5, 2007 |
| INVENTOR(S) | : Jan Konvicka et al. |

It is certified that error appears in the above-identified patent and that said Letters Patent is hereby corrected as shown below:

On the Cover page, item [73] in the Assignee, change the Assignee from "Mikron Agie Charmilles Ali" to --Mikron Agie Charmilles AG--.

Signed and Sealed this

Eleventh Day of December, 2007

JON W. DUDAS
*Director of the United States Patent and Trademark Office*